United States Patent
Kohno et al.

[11] Patent Number: 5,993,101
[45] Date of Patent: Nov. 30, 1999

[54] SHAFT COUPLING AND SHAFT COUPLING STRUCTURE FOR USE IN IMAGE FORMING APPARATUS

[75] Inventors: Hironobu Kohno; Toshiaki Kusuda, both of Osaka, Japan

[73] Assignee: Mita Industrial Co., Ltd., Osaka-fu, Japan

[21] Appl. No.: 09/098,112

[22] Filed: Jun. 16, 1998

[30] Foreign Application Priority Data

Jun. 19, 1997 [JP] Japan ................................. 9-163024

[51] Int. Cl.⁶ .................................................. C03B 37/12
[52] U.S. Cl. ........................... 403/306; 403/14; 403/362; 399/116
[58] Field of Search .................................. 403/300, 306, 403/321, 305, 325, 322.1, 13, 14, DIG. 4, 362; 399/116, 117, 110, 122, 119

[56] References Cited

U.S. PATENT DOCUMENTS

| 4,386,839 | 6/1983 | Kumagai et al. ............... 399/116 X |
|---|---|---|
| 4,433,767 | 2/1984 | Thor . |
| 4,436,468 | 3/1984 | Ozaki et al. ..................... 403/362 X |
| 4,572,682 | 2/1986 | Iwata . |
| 5,128,715 | 7/1992 | Furuyama et al. ............... 399/116 X |
| 5,326,186 | 7/1994 | Nyberg ............................. 403/325 X |
| 5,417,399 | 5/1995 | Saito et al. ...................... 403/305 X |
| 5,562,360 | 10/1996 | Huang ............................. 403/305 X |

FOREIGN PATENT DOCUMENTS

| 115315 | 8/1984 | European Pat. Off. . |
|---|---|---|
| 490365 | 6/1992 | European Pat. Off. . |
| 322048 | 1/1903 | France . |
| 1489649 | 11/1967 | France . |
| 2376968 | 8/1978 | France . |
| 2578927 | 9/1986 | France . |
| 2544780 | 4/1977 | Germany . |
| 427935 | 5/1935 | United Kingdom . |
| 972445 | 5/1963 | United Kingdom . |
| 2141520 | 12/1984 | United Kingdom . |
| 2214609 | 9/1989 | United Kingdom . |
| 2239303 | 6/1991 | United Kingdom . |
| 2292178 | 2/1996 | United Kingdom . |

OTHER PUBLICATIONS

Patent Abstracts of Japan, vol. 10, No. 286 (M–521), Sep. 27, 1986 & JP 61 103036 A (Matsushita), May 21, 1986.

*Primary Examiner*—Lynne H. Browne
*Assistant Examiner*—John Cottingham
*Attorney, Agent, or Firm*—Jordan and Hamburg LLP

[57] ABSTRACT

This is invention is directed to a shaft coupling for coupling a first shaft and a second shaft. The shaft coupling includes an outer ring for encasing one end of the first shaft and one end of the second shaft; a first pin provided in the outer ring and the first pin extending in a first direction; and a second pin provided in the outer ring and the second pin extending in a second direction substantially orthogonal to the first direction; wherein the first shaft and the first pin are so set such that the end of the first shaft is movable along the first pin and the second shaft and the second pin are so set that the end of the second shaft is displaceable along the second pin.

12 Claims, 4 Drawing Sheets

SHAFT COUPLING AND SHAFT COUPLING STRUCTURE FOR USE IN IMAGE FORMING APPARATUS

BACKGROUND OF THE INVENTION

Conventionally, in a tandem type color copier, it has been a common practice that each photosensitive drum for respective color components, namely black, magenta, cyan, yellow, is combined together with the respective toner tank to construct a photosensitive unit, and each photosensitive unit is arranged along a feed direction of the copy sheet. Then a toner image is developed onto the respective photosensitive units to perform a multiple toner transferring operation in series, i.e., a second toner image onto a first toner image formed on the photosensitive unit, until a forth toner image is transferred onto the previous toner image without color mis-matching to finally obtain a desired color image.

In the above described photo-sensitive drum unit, a rotary drive of the photo-sensitive drum is given from a power source of a main body of a copy machine via a drive transmission mechanism.

In addition, when the toner cartridge needs to be replaced or when the photosensitive drum needs to be replaced with a new one due to elapse of its available life, the photosensitive unit is so constructed that it can be detached from the drive transmission mechanism.

As the aforementioned drive transmission mechanism for transmitting the drive from the power source to the photosensitive drum unit, there are several types. One is a so-called direct drive transmission type in which a gear portion formed at the drum flange of the photo sensitive drum is meshed in a gear train driven from the power source and another type is a co-called drum shaft type in which four shafts are extended from the power source and the respective photosensitive drums are engaged with the respective drum shafts and the other type is a so-called coupling type in which the driven shaft of the photosensitive drum is connected to the drive shaft via a coupling.

In practical sense, the photosensitive unit as a replaceable part is designed to have manufacturing tolerances, thus at the time of replacement, such manufacturing tolerance has to be taken into consideration when connecting the driven shaft of the photosensitive drum to the drive shaft. In view thereof, it would be much easier when using a coupling for such connection between the drive shaft and the driven shaft of the photosensitive drum unit for the coupling by itself can absorb such manufacturing tolerances. Examples of this type of connection, namely a coupling connection, are such as a cruciform universal joint as shown in FIG. 6 and an Oldham's coupling as shown in FIG. 7.

Referring now to FIG. 6, two pins 2,3 orthogonary arranged from one another, are provided at a connecting plate 1 and a C-shaped arm 4,5 is pivotally fitted to the opposite ends of each pin 3,2 respectively. Thus when two shafts 6,7 to be coupled are intersecting each other at a certain angle, i.e., two shafts are not aligned on a straight line but are bent with respect to each other by a certain bending angle, such bending angle is absorbed by the coupling, thereby causing no adverse effect on the coupling status of those two shafts 6,7. In addition, the C-shaped arm 4 is slightly displaceable along the pin 2 and similarly the C-shaped arm 5 is slightly displaceable along the pin 3, thus such misalignment between the axes, S1 & S2, of the shaft 6 and the shaft 7, if occurred, can also be absorbed by this structure of the cruciform joint.

On the other hand, in the Oldham's coupling structure, a shaft 8 and a shaft 9 are respectively fixed onto a disk 10 and a disk 11 and a connecting disk 12 is interposed between the disks 10, 11. Furthermore, orthogonally crossing grooves are respectively formed on both surfaces of the disk 12 and a projection 13 formed on the disk 10 and a projection formed on the disk 11 are respectively engaged with grooves on the respective sides of the disk 12 in such a manner that the disk 10 is slidable along the extension direction of the projection 13 and the disk 11 is slidable along the extension direction of the projection 14. Thus, when the axis S3 of the shaft 8 and the axis S4 of the shaft 9 are not aligned from each other in some degree, this mis-alignment of the shaft axes is taken care by this coupling.

However, the cruciform joint of this conventional type is consisted of a great number of parts such as a pair of C-shaped arms 4,5, a connection plate 1, pins 2,3 and so forth, and thus has a complicated structure. Accordingly there has been a problem in assembling the drive and driven portions with this joint. On the other hand, with the Oldham's joint, the problem associated with the cruciform joint, difficulty in assembling, is solved, as the Oldham's joint is greatly simple in structure as compared with the cruciform joint. However, the Oldham's joint cannot cope with the shafts to be coupled, whose axes are not in parallel from each other.

In view of the above, there is certainly room for improvement in designing a coupling structure for use in coupling the power source of the main body of the copy machine and the photosensitive drum of the photosensitive unit.

SUMMARY OF THE INVENTION

It is, therefore, an object of this invention to solve the aforementioned problems residing in the conventional devices.

It is another object of this invention to provide a shaft coupling and a shaft coupling structure for use in an image forming apparatus that are simple in structure and yet capable of coping with center mis-alignment between the axes of a drive shaft and a driven shaft and transmitting a power drive from the drive shaft to the driven shaft.

In order to fulfill the above objects according to this invention, a shaft coupling for coupling a first shaft and a second shaft comprises: an outer ring for encasing one end of the first shaft and one end of the second shaft; a first pin provided in the outer ring and the first pin extending in a first direction; and a second pin provided in the outer ring and the second pin extending in a second direction substantially orthogonal to the first direction; wherein the first shaft and the first pin are so set such that the end of the first shaft is movable along the first pin and the second shaft and the second pin are so set that the end of the second shaft is moveable along the second pin.

With the aforementioned shaft coupling of this invention, the drive shaft and the driven shaft, if the center misalignment exists between the two shafts, are securely coupled together. The shaft coupling absorbs the dimensional tolerances of the drive shaft and the driven shaft having existed in manufacturing stage, thus coupling operation of the two shafts is efficiently performed with ease and without increasing the cost of the shaft coupling.

Another aspect of this invention is directed to a shaft coupling for use in an image forming apparatus. The shaft coupling comprises a drive shaft adapted for being driven by a motor; a driven shaft adapted for being driven by the drive shaft; an outer ring for encasing one end of the drive shaft and one end of the driven shaft therein; a first pin provided in the outer ring and the first pin extending in a first direction; and a second pin provided in the outer ring and the second pin extending in a second direction substantially orthogonal to the first direction; the first shaft and the first pin are so set such that the end of the drive shaft is movable along the first pin and the second shaft and the second pin are so set that the end of the driven shaft is movable along the second pin.

With the aforementioned shaft coupling structure for the image forming apparatus of this invention, the drive shaft of the image forming apparatus main body side and the driven shaft of the replaceable unit side, if the center misalignment exists between the two shafts, are securely coupled together. In other words, the shaft coupling absorbs the misalignment caused by the dimensional tolerances in manufacturing stage, thus coupling job for a replaceable unit of the image forming apparatus is efficiently performed with ease.

These and other objects, features and advantage of the present invention will become more apparent upon reading the following detailed description and accompanying drawings.

DETAILED DESCRIPTION

Figure 1:
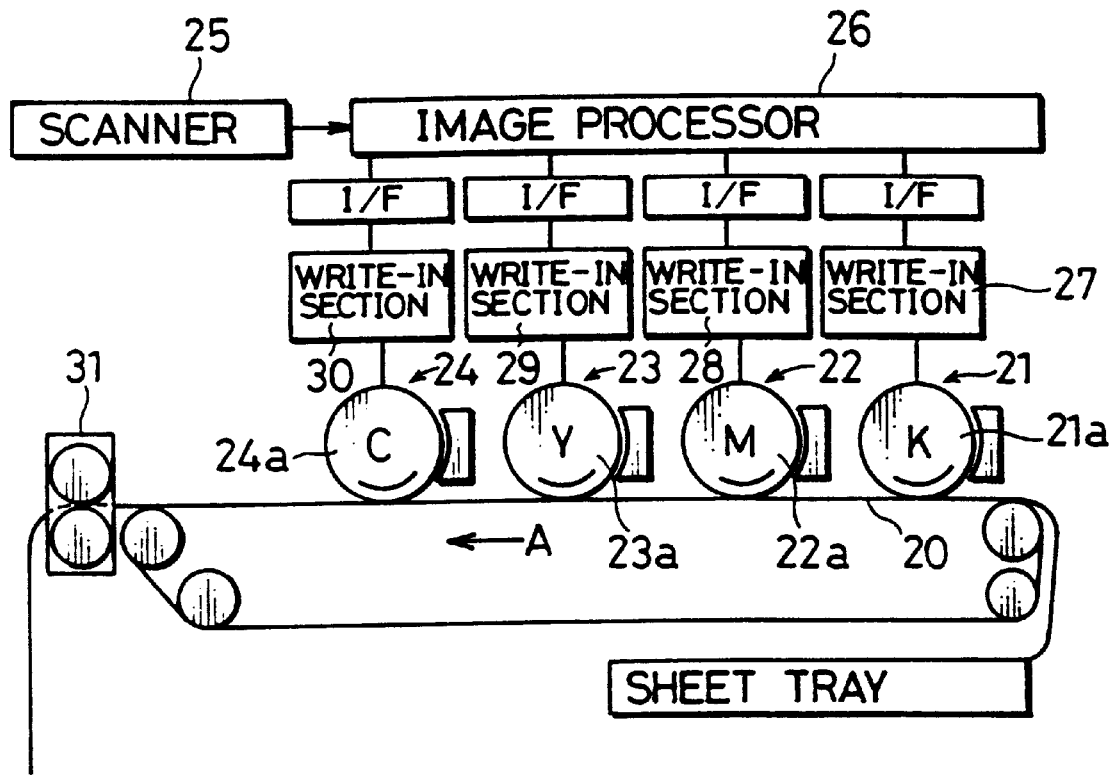
FIG. 1 is an explanatory diagram showing a color copy machine embodying a shaft coupling of this invention.

Hereinafter, preferred embodiments of this invention are described in details along with the drawings. FIG. 1 shows a copy machine in a symbolic representation. The copy machine of FIG. 1 is to obtain a color image by transferring toner in plural times onto a copy sheet placed on a transfer belt 20. As shown in FIG. 1, the copy machine comprises a photosensitive unit for each color including a photosensitive drum, toner tank and the like, namely a photosensitive unit 21 for black, a photosensitive unit 22 for a color magenta, a photosensitive unit 23 for a color black, and a photosensitive unit 24 for a color cyan. All those photosensitive units 21–24 are arranged in tandem manner towards an arrow A.

An operation of each photosensitive unit includes a step of converting an image into an RGB electric signal when the image is being scanned by a scanner 25; a step in which an area separation of the image is performed by an image processor 26 made of such as a micro-computer; a step in which the RGB signal is converted respectively to colors of K, M, Y, and C. And the color information of KMYC is stored in a memory. Subsequently, at each of write-in sections, 27–30, a laser diode (unillustrated) in accordance with each color component emits a laser beam and the laser beam is projected onto a photosensitive drum to form an electric static latent image on the photosensitive drum. Thereafter, toner images are formed on the photosensitive drums 21a–24a respectively, and are, then, transferred onto the copy sheet and fixed onto the copy sheet by a fixing unit 31 to complete the copying operation.

The aforementioned photosensitive unit 21–24 is subject to the replacement due to the empty state of the toner and the expiration of the photosensitive drum's life. Further, the manner of rotating each photosensitive drum 21a–24a is, but not limited to, of a type in which a drive of one motor is branched out to each photosensitive drum or a type in which four motors are provided to drive each of the photosensitive drums.

Figure 2:
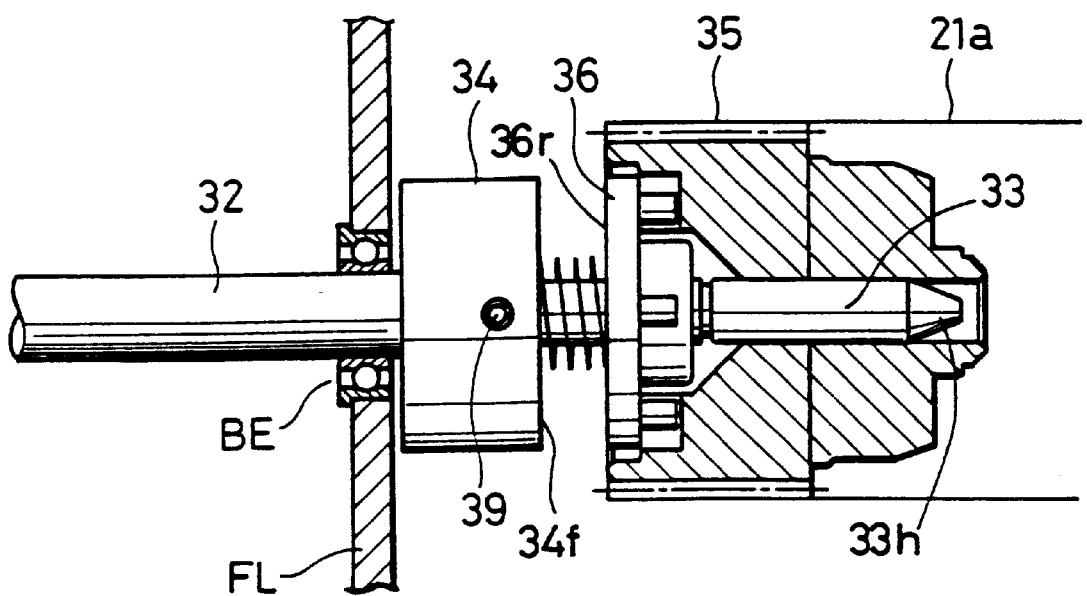
FIG. 2 is a partly sectioned plan view showing an attachment structure of a replaceable unit of this invention.

In FIG. 2, the photosensitive drum 21a as a representation of the photosensitive units for respective colors and a drive shaft 32 extending from a power source are shown when these parts are in connection state.

Referring to FIG. 2, a shaft coupling 34 is interposed between the drive shaft 32 and a driven shaft 33. On the driven shaft 33, provided is a connecting member 36 which is to be engaged with a drum flange 35 mounted on the end portion of the photosensitive drum 21a. Further, indicated by "FL" in FIG. 2 is a vertical flame inside of the copy machine and indicated by "BE" is a bearing supporting the drive shaft 32.

Hereinafter, the shaft coupling 34 and the connecting member 36 are described in detail.

Figure 3:
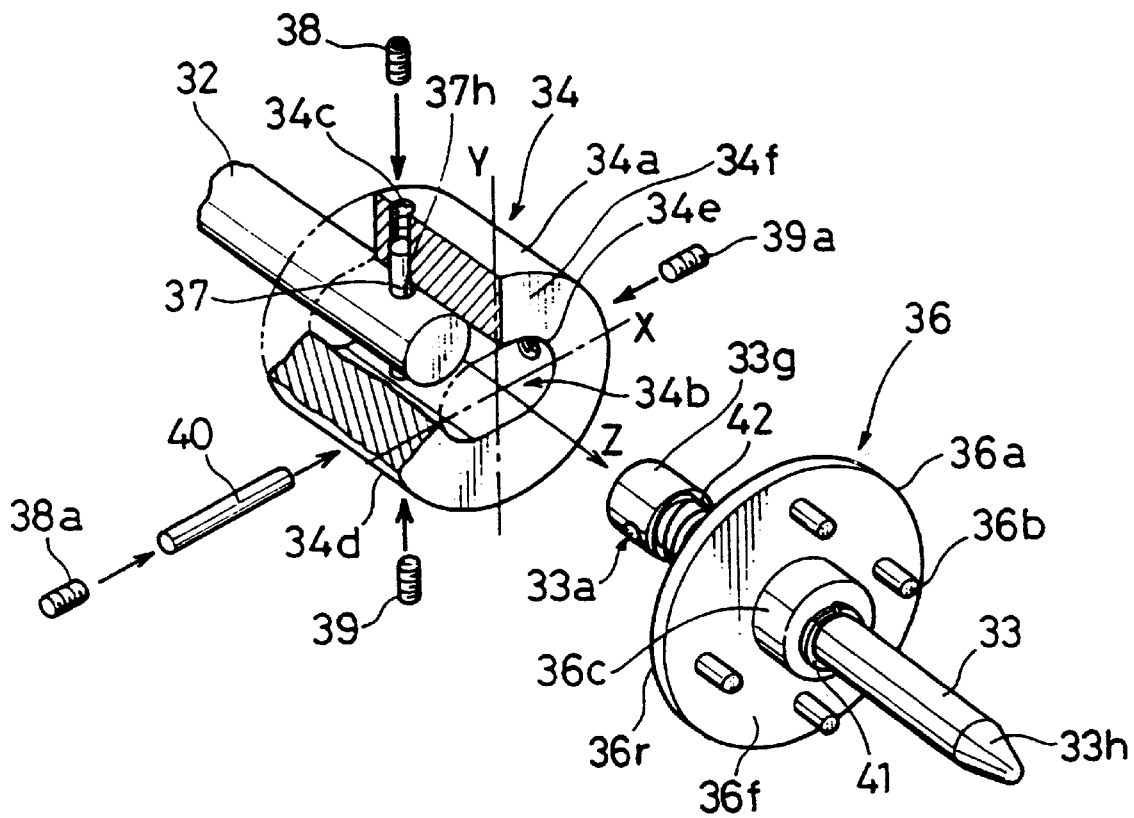
FIG. 3 is a partly cut perspective view showing a structure of the shaft coupling of this invention.

FIG. 3 is a partly cut perspective drawing showing a structure of the coupling shaft 34. In this figure, the shaft coupling 34 has an outer ring 34a which is being loosely fitted onto the lead end of the drive shaft 34 and the tail end of the driven shaft 33.

The outer ring 34a has a through hole 34b therein having, but not limited to, an oval shape cross section. The outer ring 34a is so constructed th at a first pin 37 is insertable from the outer circumference surface of the outer ring 34a in a direction parallel to a short width dimensional direction of the oval shape hole which is indicated with "Y" (hereinafter referred to as a Y direction). Thus, when the drive shaft 32 is inserted from outside of the outer ring 34a along the axial direction "Z" into the through hole 34b and thereafter the first pin 37 is inserted through a first pin hole 37h formed in the lead end of the drive shaft 32 which is positioned in the outer ring 34a at a certain position in the Z direction. When the first pin 37 is penetrated through the first pin hole 37h of the drive shaft 32, a hexagon on socket set screw 38, 39, as a fixing member, is screwed into the outer ring 34a from radially outward direction of the outer ring 34a to securely hold the first pin 37 penetrated through the first pin hole 37h of the first shaft 32 in the outer ring 34. Upon tightening up the screws with hexagonal indent 38, 39 to fix the first pin 37 in the outer ring 34, the drive shaft 32 is held in the outer ring 34 with a play in the Y direction. In this case, the play is defined as a clearance between the circumference of the drive shaft 32 and the inner wall of the outer ring 34a along the first pin 37. In other words, the drive shaft 32 is displaceable along the first pin 37 by a certain clearance. It should be noted, however, a screw hole 34c is formed in a rear portion of the outer ring 34 along the Z direction and is internally threaded to a certain depth from the circumferential surface of the outer ring 34a where the depth is about the length of the screw 38. The screw hole 34d is formed in a very similar manner as the screw hole 34c thus the repetitive explanation is omitted.

On the other hand, the driven shaft 33 is inserted from an opening 34b side of the outer ring 34a to a certain position along the Z direction and then a second pin 40 is inserted through a second pin hole 33a formed in a head portion 33g of the driven shaft 33 and a pair of screws 38a, 39a are screwed into the respective screw holes formed in the outer circumferential surface of the outer ring 34a to fix the second pin 40 in the outer ring 34a. Moreover, in order to facilitate smooth movement of the shaft along the pin, a sleeve metal such as a Bespel SP-21 produced by Dupon Ltd. or a sleeve metal made of such as a dry met produced by NTN Co. Ltd.

The second pin 40 is inserted to the outer ring 34a through either one of through pin holes 34e, 34f and fixing method of the second pin 40 is, very similar to the that of the first pin 37, done with a pair of screws 38a, 39a. Upon tightening up the pair of screws 38a, 39a so as to press the opposite ends of the second pin 40 along the X-direction in the outer ring 34a, the driven shaft 33 is displaceable in the oval shaped through hole 34b in the outer ring 34a along the second pin 40 by a certain dimension. As the head portion 33g of the driven shaft 33 is pivotable around the second pin 40, the lead end 33h of the driven shaft 33, unless it is supported, hangs downward, thus an adequate measure should be taken in order to prevent or lessen this hang state of the lead end 33h of the driven shaft 33. The easiest measure to be taken is to shorten the length of the driven shaft 33. Further, the lead end 33h of the driven shaft 33 is preferably a sharp pointed or tapered to decrease the diameter as approaching to the lead end so that the driven shaft is easily guided into the drum flange of the photosensitive drum.

Figure 4:
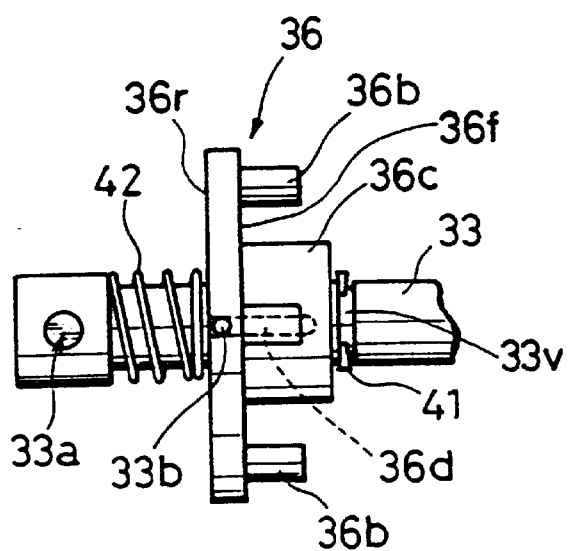
FIG. 4 is a front view showing essential portion of a driven shaft and a flange shown in FIG. 3.

Referring now to FIG. 4, the connecting member 36 has a flange 36a that is movable along the driven shaft 33. The flange 36a has on its front surface 36f four connecting pins 36b which are arranged along the same circumference at equal pitch. A tubular shape color portion 36c is formed at the central portion of the flange 36a. The color portion 36c is internally formed with a groove 36d extending in the axial direction (Z direction). A guide pin 33b is projected from the outer circumference of the driven shaft 33 to fit into the groove 36d of the color portion 36c to guide the movement of the flange 36a along the Z-direction. Further, a C-ring 41 or the like, which functions as a stopper, is fitted around the circumferential groove 33v of the driven shaft 33 to limit the movement of the flange 36a towards the lead end 33h. Moreover, a coil spring 42 is interposed between the enlarged diameter portion (previously referred to as the head portion) 33g and the rear surface 36r of the flange 36 to bias the flange 36a towards the lead end 33f of the driven shaft 33.

Figure 5:
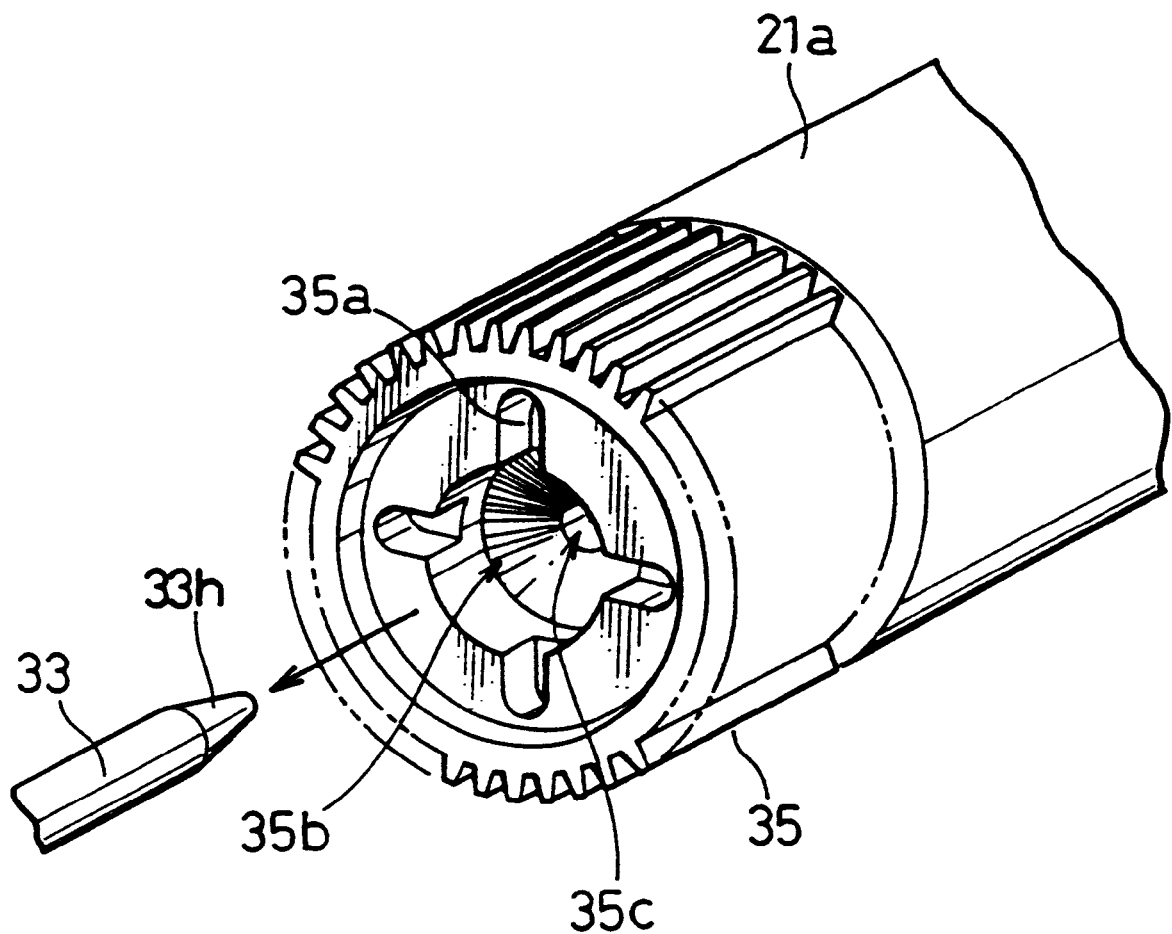
FIG. 5 is a perspective view showing a structure of drum flange of FIG. 2.
Figure 6:
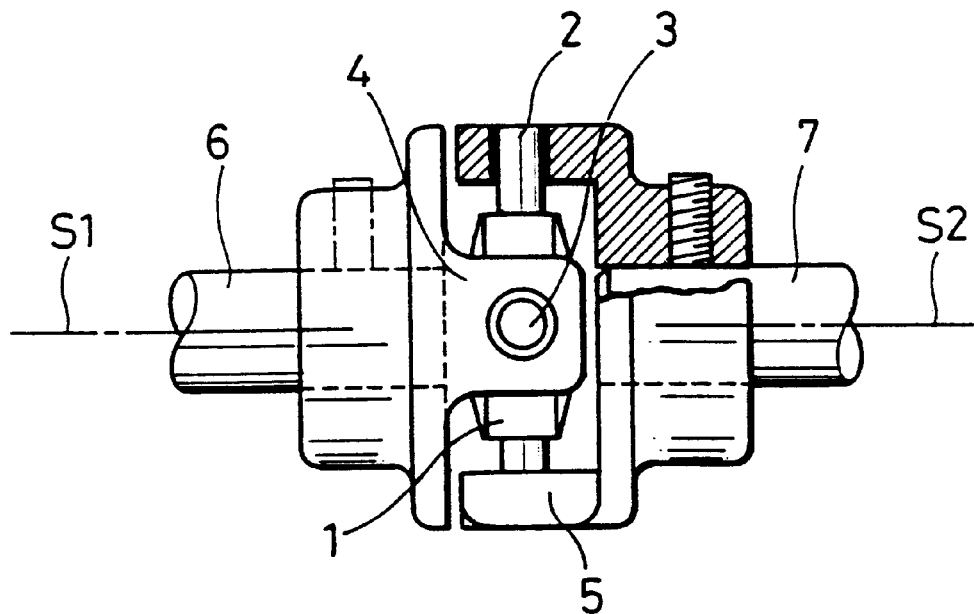
FIG. 6 is a front view showing a structure of a cruciform joint.
Figure 7:
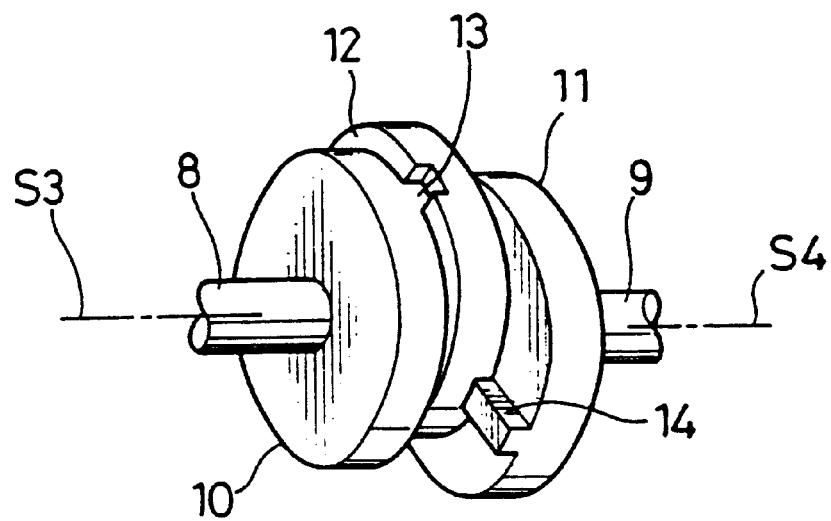
FIG. 7 is a perspective view showing a structure of an Oldham's joint.

FIG. 5 shows the photosensitive drum 21a to be engaged with the aforementioned connecting member 36 from the drum flange side. On the end surface of the drum flange 35, there formed an engaging recess in the cruciform to be engaged with the four connecting pins 36b. The middle of the cruciform engaging recess is formed with a cone-shaped recess 35b (a truncated conical shape) and at the innermost thereof, there is formed a through hole 35c for enclosing the lead end 33h of the driven shaft 33.

The aforementioned coupling unit including the shaft coupling 34 and the connecting member 36 is provided in the main body of the copy machine with respect to the photosensitive drum for each color.

An operation of the coupling unit as described above is hereinafter described with reference to FIGS. 2–5.

When the toner is spent (used up completely) or when the life of the photosensitive drum is expired, the photosensitive unit 21 is to be replaced. In the following, described is the case of detaching the photosensitive unit 21, whose life was expired, from the main body of the copy machine. First, the photosensitive unit 21 is pulled out to the front to remove the same from the main body and a new photosensitive unit 21 is put back into the receptacle. Then the lead end 33h of the driven shaft 33 is guided along the cone-shape recess 35b formed on the drum flange 35 of the photosensitive drum 21a and is inserted to the through hole 35c.

Subsequently, the connecting pins 36b of the flange 36 are brought into contact with the end surface of the drum flange 35 to fit into the engaging recess 35a to realize the engagement state of the driven shaft 33 with the drum flange 35. Even when the connecting pins 36b (also referred to as third pins) are not engaged into the engaging recess 35b, by merely rotating the photosensitive drum 21a around the longitudinal axis thereof with respect to the driven shaft 33, the connecting pins 36b on the flange 36a are guided toward the inner-depth side of the engaging recess once the positions of the four connecting pins matches with the recess because of the coil spring 42 biasing the flange 36a to the lead end 33h of the driven shaft 33. Accordingly, the engagement of the driven shaft 33 to the drum flange 35 can be easily performed.

It should be noted that the axis of the drive shaft 32 is not necessarily aligned with the axis of the photosensitive drum 21a due to the dimensional tolerance in manufacturing stage and there usually exists a central misalignment between the axes. The term "center misalignment" between the two axes includes an angular mismatch in which two axes to be joined together are not in parallel with each other and a position misalignment where two axes are in parallel but are apart from each other by a certain distance. In this case, the coupling unit 34 is so constructed as to deal with the aforementioned center misalignments between the axis of the driven shaft 33 and the axis of the drive shaft 32. Specifically, in this coupling unit 34, the outer ring 34a is pivotable around the second pin 40, i.e., the X-axis, and is pivotable around the first pin 37, i.e., the Y-axis, thus the drive shaft 32 and the driven shaft 33, when they are intersected from each other in non-parallel manner, are coupled together in satisfactory manner. On the other hand, the outer ring 34a is displaceable along the first pin 37 in the Y-axis and is displaceable along the second pin 40 in the X-axis, thus the center misalignment between the two axes, 32, 33 in latter case, i.e., parallel but some distance apart from each other, are coupled together in the satisfactory manner.

Further, an adequate measure should preferably be taken as the driven shaft 33 hangs downward relative to the axis of the drive shaft 32 when the driven shaft 33 is not assembled with the photosensitive unit 21. An example of such measures is to equip a magnet onto the upper portion of the front surfaces 34f of the outer ring 34 such that the upper portion on the rear surface 36r of the flange 36a is attracted towards the magnet placed at upper portion of the front surface 34f of the outer ring 34a, however, the relative position between the driven shaft 33 and the outer ring 34a must be set at the condition shown in FIG. 3 at the time of connecting the driven shaft 33 to the photosensitive unit 21. Another possibility is to place a pair of magnets, which are repulsing each other, on the lower portion of the front surface 34f of the outer ring 34a and on the corresponding position of the rear surface 36r of the flange 36a so that the driven shaft 33 can be maintained its horizontal posture due to the repulsing force generated between the lower portion of the flange 36a and the corresponding lower portion of the outer ring 34a.

Further, another measure to lessen the magnitude of the downward displacement of the lead end 33h of the driven shaft 33 with respect to the axis of the drive shaft 32 is to place two coil springs around the first pin 37 at a top and a bottom clearances formed between the inner wall of the outer ring 34a and the outer circumference of the drive shaft 32. In so doing, the drive shaft 33 is kept substantially at the center portion of the outer ring 34a, thus the downward displacement of the lead end of the driven shaft 33 becomes smaller than the case when there is no means to keep the drive shaft 32 at the middle portion of the outer ring 34a.

Yet, furthermore, another measure to lessen the magnitude of the downward displacement of the leading end 33h of the drive shaft 33 with respect to the axis of the drive shaft 32 is to place a coil spring in the space between the front surface 34f of the outer ring 34 and the rear surface 36r of the flange 36a at the portion radially outward of the coil spring 42.

Alternately, the number of connecting pins 36 is not limited to the aforementioned number, 4, but may be one or more than one.

Furthermore, the application of the shaft coupling of this invention is not limited to the coupling of the drive source and the photosensitive unit of the color copier but may be to the drive source and the photosensitive unit of a monotonous copier (i.e., black & white copier) and to shafts in general used in the copier, i.e., connection to the power source of the replaceable toner unit in which the occurrence of the center misalignment is highly likely.

With the aforementioned coupling structure for the image forming apparatus of this invention, the drive shaft 32 of the image forming apparatus main body side and the driven shaft 33 of the replaceable unit side, if the center misalignment exists between the two shafts, are securely coupled together. In other words, the shaft coupling absorbs the dimensional tolerance in manufacturing, thus replacement job for the replaceable unit is efficiently performed with ease.

Although the present invention has been fully described by way of examples with reference to the accompanying drawings, it is to be understood that various changes and modifications will be apparent to those skilled in the art. Therefore, unless otherwise such changes and modifications depart from the scope of the present invention, they should be constructed as being therein.

What is claimed is:

1. A shaft coupling for coupling a first shaft and a second shaft, the shaft coupling comprising:
   an outer ring for encasing one end of the first shaft and one end of the second shaft;
   a first pin provided in the outer ring and the first pin extending in a first direction;
   a pair of fixing members in the outer ring fixing the opposite ends of the first pin in the outer ring;
   a second pin provided in the outer ring and the second pin extending in a second direction substantially orthogonal to the first direction;
   a second pair of fixing members provided in the outer ring at the opposite ends of the second pin in such a manner that the opposite ends of the second pin are fixed in the outer ring by the second pair of fixing members; and
   wherein the first shaft and the first pin are so set such that the end of the first shaft is axially movable along the first pin and the second shaft is axially movable along the first pin and the second shaft and the second pin are so set the end of the second shaft is axially displaceable along the second pin.

2. The shaft coupling as defined in claim 1, wherein the flange is movable along the second shaft in the axial direction thereof and a bias member is provided between a coupling end of the second shaft and the flange so that the flange is biased toward the other end of the second shaft.

3. The shaft coupling as defined in claim 2, wherein the second shaft has an enlarged portion at its rear end and a sloped portion at the leading end and the flange is slidably provided along the second shaft between the enlarged portion and a middle of the second shaft at which a stopper is placed.

4. The shaft coupling as defined in claim 3, wherein the second pin is pierced at the enlarged portion of the second shaft.

5. The shaft coupling as defined in claim 4, wherein the bias member is a coil spring and is placed between the rear end surface of the flange member and the enlarged portion of the second shaft.

6. The shaft coupling as defined in claim 5, wherein the flange is movable along the driven shaft in the axial direction thereof and a bias member is provided between a coupling end of the driven shaft and the flange so that the flange is biased toward the other end of the driven shaft.

7. A shaft coupling according to claim 1 wherein said pair of fixing members are screws.

8. A shaft coupling according to claim 1 wherein said second pair of fixing members are screws.

9. A shaft coupling for use in an image forming apparatus, the shaft coupling comprising:
   a drive shaft adapted for being driven by a motor;
   a driven shaft adapted for being driven by the drive shaft and having a flange and a connecting pin extending from the flange in the axial direction of the shaft coupling for being detachably attached to a replaceable unit;
   an outer ring for encasing one end of the drive shaft and one end of the driven shaft therein;
   a first pin provided in the outer ring and the first pin extending in a first direction; and
   a second pin provided in the outer ring and the second pin extending in a second direction substantially orthogonal to the first direction, wherein the drive shaft and the first pin are so set such that the end of the drive shaft is movable along the first pin and the drive shaft and the second pin are so set that the end of the driven shaft is movable along the second pin.

10. A shaft coupling comprising:
    a frame for an image forming apparatus;
    a drive shaft rotatably supported on said frame;
    a photosensitive drum;
    a driven shaft for rotating said photosensitive drum;
    a coupling which includes an outer ring for encasing one end of the drive shaft and one end of the driven shaft:
    a first pin provided in the outer ring and extending through an end portion of the drive shaft, the first pin extending in a first direction; and
    a second pin provided in the outer ring and extending through an end portion of the driven shaft, the second pin extending in a second direction substantially orthogonal to the first direction; wherein the drive shaft and the first pin are so set such that the end portion of the driven shaft is pivotably and axially moveable relative to the first pin and the driven shaft and the second pin are so set such that the end portion of the driven shaft is pivotably and axially moveable relative to the second pin, thereby enabling the coupling to couple angularly misaligned and axially offset drive and driven shafts.

11. A method of coupling angularly misaligned and axially offset shafts comprising:

providing a coupling member having first and second pins extending substantially perpendicular to one another;

supporting said first shaft on said first pin for pivotal and axial slidable movement relative to said first pin;

supporting said second shaft on said second pin for pivotal and axial slidable movement relative to said second pin;

coupling said first and second shafts when said first and second shafts are axially offset relative to one another and when said first and second shafts are angularly misaligned relative to one another by sliding said coupling member axially along at least one of said first and second pins and by pivoting said coupling member about at least one of said first and second pins;

utilizing said first shaft as a drive shaft and utilizing said second shaft as a driven shaft;

slidably mounting a flange on said driven shaft for sliding movement in an axial direction; and biasing said flange on said driven shaft in an axial direction away from said coupling member.

12. A shaft coupling for coupling a first shaft and a second shaft, the shaft coupling comprising:

an outer ring for encasing one end of the first shaft and one end of the second shaft, said outer ring having substantially an oval shape in cross section and having a through hole extending in the axial direction of the outer ring;

a first pin provided in the outer ring and the first pin extending in a first direction;

a pair of fixing members in the outer ring fixing the opposite ends of the first pin in the outer ring; and a second pin provided in the outer ring and the second pin extending in a second direction substantially orthogonal to the first direction; wherein the first shaft and the first pin are so set such that the end of the first shaft is axially movable along the first pin and the second shaft and the second pin are so set that the end of the second shaft is axially displaceable along the second pin.

* * * * *